US006866788B1

United States Patent
Baig et al.

(10) Patent No.: US 6,866,788 B1
(45) Date of Patent: Mar. 15, 2005

(54) METHOD AND DEVICE FOR PURIFYING AQUEOUS EFFLUENTS BY CATALYTIC OXIDATION

(75) Inventors: Sylvie Baig, Montesson (FR); Michel Cordier, Nanterre (FR); Alain Truc, Levallois-Perret (FR)

(73) Assignee: Ondeo Degremont (FR)

( * ) Notice: Subject to any disclaimer, the term of this patent is extended or adjusted under 35 U.S.C. 154(b) by 123 days.

(21) Appl. No.: 10/130,603
(22) PCT Filed: Oct. 24, 2000
(86) PCT No.: PCT/FR00/02955
§ 371 (c)(1),
(2), (4) Date: Aug. 7, 2002
(87) PCT Pub. No.: WO01/38235
PCT Pub. Date: May 31, 2001

(30) Foreign Application Priority Data

Nov. 26, 1999 (FR) .............................. 99 14937

(51) Int. Cl.⁷ ................................................. C02F 3/00
(52) U.S. Cl. ...................... 210/758; 210/759; 210/760; 210/761; 210/762; 210/763; 210/765; 210/221.2; 210/150; 210/188; 210/189; 210/218
(58) Field of Search ................................. 210/758–763, 210/765, 221.2, 150, 188, 189, 218

(56) References Cited

FOREIGN PATENT DOCUMENTS

DE          4446375 C1 *  4/1996  ............. C02F/1/78

* cited by examiner

Primary Examiner—Chester T. Barry
(74) Attorney, Agent, or Firm—Connolly Bove Lodge & Hutz LLP

(57) ABSTRACT

The invention concerns a method for purifying aqueous effluents, in particular polluted water, by catalytic oxidation using a three-phase reactor comprising two communicating chambers. The invention is characterised in that it consists in: maintaining the catalyst suspended and continuously circulating it between the two chambers of said reactor, by entrainment under the effect of carrier gas injected into one of said chamber, and in oxidizing the pollutants in contact with the in the other chamber, by injecting a reactive oxidizing gas in said other chamber.

10 Claims, 1 Drawing Sheet

METHOD AND DEVICE FOR PURIFYING AQUEOUS EFFLUENTS BY CATALYTIC OXIDATION

FIELD OF THE INVENTION

The subject-matter of the present invention is a process and a device for the purification of aqueous effluents by catalytic oxidation which makes use of a three-phase reactor through which the effluents to be treated continuously pass, which effluents are kept in contact with a catalyst and are subjected to an oxidative chemical reaction.

BACKGROUND OF THE INVENTION

It is known that the continuous, three-phase reactors comprising a heterogeneous catalyst and used industrially are stationary bed reactors with two-phase flow or fluidized bed reactors comprising three phases.

The most widespread type of catalytic reactor is that where the fluid phases pass through a stationary bed composed of a stack of catalyst particles. Three configurations can be envisaged, according to the respective directions of flow of the gas and liquid phases:

downward cocurrent, upward cocurrent, countercurrent.

Stationary bed catalytic reactors with downward cocurrent flow are the most widespread on the industrial scale. They ensure that the catalytic bed is kept immobile and, for this reason, they are preferred to the upward cocurrent systems, for which the movement of the catalyst particles under the effect of the flow leads to unacceptable attrition. On the other hand, stationary bed and downward cocurrent flow reactors exhibit failings with regard to distribution of the liquid which are solved in the case of the upward flow systems.

Three-phase reactors with countercurrent flow are difficult to make use of industrially because of the phenomenon of flooding, which severely limits the flow rates of each of the phases which have to pass through the catalytic bed. In this case, the solution consists in using larger catalyst particles than those accepted in stationary beds, which unfortunately has the consequence of reducing the effectiveness of the said catalyst.

Turbulent or fluidized bed three-phase reactors make it possible to improve fluid-catalytic solid transfers by using a material with a very fine particle size. In this case, the liquid and gas phases pass through the reactor from the bottom upwards and combine to keep the solid particles, with a size generally of between 0.1 and 5 mm, in suspension. In comparison with a stationary bed, the fluidized bed exhibits two advantages: better control of the temperature and the possibility of extracting the catalyst during operation in order to replace it. On the other hand, a major difficulty appears in the ratio of the acceptable gas and liquid flow rates. This is because fluidization is easily achieved in the case where the velocity of the liquid is relatively high whereas the velocity of the gas remains low. In the reverse case, a system of pulsed type, with alternation of concentrated and dilute regions, is established. Partial recycling of the liquid phase, carried out by means of an immersed or external pump, makes it possible to solve this problem but at the expense of the efficiency of the reactor. Furthermore, a sufficient height has to be provided in the top part of the reactor, above the upper level of the catalyst bed, in order to avoid entrainment of the particles.

The two types of three-phase reactors which are stated above have already been employed, as described above, in the field of the treatment of water by oxidation in the presence of heterogeneous catalyst.

For example, WO 90/14312 and FR-A-2 291 687 relate to processes for ozonization with solid catalysts positioned as column packing and fed as an upward cocurrent with the liquid to be treated and the ozone-comprising gas.

In FR-A-2 269 167, the granular ozonization catalyst is inserted between stationary layers of inert material to fill a reactor comprising four chambers in series operating as an upward cocurrent system.

WO 96/21623 and WO 97/14657 provide for catalytic ozonization of wastewater to be carried out in a stationary bed column with prior dissolution of the ozone in the liquid phase in an upstream contactor, that is to say in a two-phase reactor.

U.S. Pat. No. 4,007,118 discloses a plant or effluent treatment by ozonization in a bubble contactor operating countercurrentwise with flows of the liquid downwards and of the gas upwards through a catalyst present in immersed bags or deposited on a stationary support or dispersed in the reaction medium and recycled after separation from the treated water.

EP-A-0 625 482 employs a treatment of polluted water by oxidation in the presence of ozone in a treatment column in an upward cocurrent system with fluidized or stationary catalytic bed.

The design of stationary or fluidized catalytic bed three-phase reactors for the oxidative treatment of polluted water must take into account not only the constraints related to the properties of the catalyst (activity, selectivity and regenerability) but also variations in flow rate, in polluting load or in concentrations of suspended matter.

These three-phase reactors exhibit a number of disadvantages which will be mentioned below.

Stationary Bed Reactors:

Although the stationary bed and two-phase flow reactor exhibits the advantages of being simple to use, of easy separation of the phases and of "plug" flow of the phases, the problems of extrapolation prove to be complex. In particular, the homogeneous distribution of the liquid phase has to be rapidly achieved in order to avoid having a catalytic bed dead height with rapid deactivation of a portion of the catalyst by accumulation solid particles or of poisons.

The maintenance of good distribution of the phases, critical in downward cocurrent reactors, involves operating conditions characterized by strong interaction of the gas and liquid phases and therefore the use of a ratio of the gas/liquid flow rates of greater than 10, very high for an application in water treatment.

It is markedly preferable for the reactor to operate with an upward cocurrent of gas and of liquid; however, in this case, phenomena of backmixing of the reaction phase and the imperfect distribution of the gas inevitably appear. This is because the gas is conveyed into the catalytic bed in the form of a train of bubbles with a diameter of approximately 3 mm, the upward rate of which varies between 10 and 20 cm/s. Furthermore, the three-phase reactors with a stationary bed and an upward two-phase flow are characterized by a limited gas-liquid transfer, resulting from the low value of the interfacial area (the gas/liquid contact surface area is reduced in the case of bubbles over a large diameter), which governs the dissolution of the oxidizing gas in the liquid and consequently the rate of oxidation. Finally, and generally, it is known that the major problem encountered in the use of three-phase stationary bed reactors is the significant decrease in activity of the catalyst, resulting from the decline in the intra- and extragranular material transfer phenomena relative to the size of the catalyst particles. In both cases of cocurrent flow, the material transfer has to be optimized by establishing a strong interaction between the gas and liquid phases. This involves the use of a high gas flow rate with respect to the flow rate of liquid to be treated and therefore a large excess of oxidizing gas with respect to the pollutant, consequently resulting in a low oxidation yield.

Another major disadvantage of stationary bed catalytic reactors for application in water treatment lies in the retention of the suspended matter present in the water to be treated. According to the direction of flow of the liquid phase, the suspended matter is retained in the bottom part or in the top part of the catalytic bed and it is then necessary to periodically discharge it by expanding the bed, for example by means of a strong gas flow. This washing treatment necessarily involves halting the operation of the reactor, on the one hand, and furthermore subjects the catalyst to stresses which may be incompatible with its mechanical strength.

Fluidized Bed Reactors:

The implementation of the catalytic oxidation reaction in a fluidized bed reactor makes it possible, by using particles with a smaller particle size than that employed in stationary bed reactors (up to 0.1 mm), to provide better gas-liquid solid transfer. Another advantage of the fluidized bed lies in the possibility of continuously regenerating the catalyst in the event of rapid deactivation. In practice, for the catalytic oxidation applied to water treatment, the two fluid reaction phases, mixed or unmixed, are injected at the base of the bed present in the treatment column. According to this scheme, which is nevertheless conventional, the technology of the fluidized bed results in numerous disadvantages.

The behaviour of the fluidized three-phase reactor corresponds to that of a stirred reactor, which involves increasing the reactional volume (with respect to a three-phase reactor with a stationary catalyst bed) in order to observe the contact time necessary for the catalytic reaction, this increase in volume leading to the appearance of unfavourable backmixing phenomena.

Finally, the suspending of the catalyst particles requires, above the reaction region, a significant "disengagement" or separation region for reducing the inevitable entrainment of the catalyst particles in the treated water. Apart from these considerations, the operation of this type of reactor also requires the precise adjustment of the gas and liquid velocities to maintain the fluidization and to prevent the appearance of intermediate situations harmful to the performance of the treatment. The hydrodynamic equilibrium corresponds to precise gas and liquid flow rates, involving inflexible operation, and only allows small variations which are not easily compatible with continuous operation in the context of the treatment of wastewater of eminently variable composition.

BRIEF DESCRIPTION OF THE INVENTION

In view of the problems, which are stated above, posed by the use of the three-phase reactors according to the prior art, the object of the invention is to provide a three-phase reactor optimized for the implementation of a catalytic oxidation process for the purification of water, in which process the amount of gaseous oxidizing reactant, for treating a given amount of water, is determined by the needs of the reaction and not by hydraulic considerations, as is the case in the prior state of the art.

Another object of the invention is to provide a system for purification by catalytic oxidation which is easy to operate and which is suitable for significant variations in the quality of water to be treated as regards flow rate, oxidizable load and content of suspended matter, and in which the catalyst is continuously recycled.

The invention relates firstly to a process for the purification of aqueous effluent, in particular polluted water, by catalytic oxidation, making use of a three-phase reactor comprising two communicating compartments, characterized in that it consists in:

keeping the catalyst in suspension and circulating it continuously between the two compartments in the said reactor by entrainment under the effect of a carrier gas injected into one of the said compartments, or entrainment compartment, an upward and cocurrent flow of the gas phase and of the liquid phase being produced in the said compartment, and oxidizing the pollutants in contact with the catalyst in the other compartment, or reaction compartment, by injection of a reactive oxidizing gas into the said other compartment, the suspended catalyst circulating in the said compartment as a downward flow of the aqueous phase.

Thus, according to the process which is the subject-matter of the invention, the "circulation of the fluid to be treated" function is separated from the "oxidation chemical reaction" function, the catalyst being kept in suspension and circulating in an uninterrupted fashion between the two compartments of the reactor by entrainment under the effect of the admittance of the carrier gas into one of the compartments, the oxidation chemical reaction being carried out in the other compartment comprising the injection of a reactive oxidizing gas.

According to the present invention, this oxidizing gas can be oxygen or, preferably, ozone mixed with air or with oxygen, according to a concentration of the order of 1 to 16% by mass, for example. The carrier gas can be any gas available on site, preferably air or oxygen.

According to the present invention, the catalyst is chosen from known oxidation catalysts according to the nature of the reactive gas and of the compounds to be oxidized present in the effluent to be treated. These catalysts can in particular be metal (transition metal) oxide compounds optionally deposited on an inorganic support (alumina, silica, active charcoal, titanium dioxide, zirconia, and the like, pure or as a mixture). This catalyst can exhibit a particle size of between 20 microns and one millimeter, preferably between 100 and 300 microns.

The invention also targets a plant for the purification of aqueous effluents, in particular of polluted water, by catalytic oxidation, making use of the process defined above, characterized in that it comprises:

a three-phase reactor equipped with an inlet, immersed in the reaction volume, for the effluent to be treated and with an outlet for the treated effluent, the said reactor being separated into two compartments (an entrainment compartment and a reaction compartment) by a vertical wall which allows the effluent to pass, respectively at its upper and lower ends, the two compartments thus being in communication at the top and bottom parts of the said reactor, the latter being filled with the catalyst;

means for injection and diffusion of bubbles of a carrier gas positioned in the entrainment compartment at the level of the lower end of the said separating wall, the said carrier gas providing for the maintenance in suspension of the catalyst and its continuous circulation between the two compartments, and means for injection and diffusion of a reactive oxidizing gas, in the form of fine bubbles, in order to provide for the oxidation of the pollutants in contact with the catalyst, these means being positioned in the reaction compartment.

Other characteristics and advantages of the invention will emerge from the description given below with reference to the appended drawings, the single FIGURE of which is the diagrammatic representation, in cross section through a vertical plane, of a plant according to the invention.

BRIEF DESCRIPTION OF THE FIGURE

On referring to the single FIGURE, it is seen that, in this implementation example devoid of any limiting nature, the plant for the purification of aqueous effluents by catalytic oxidation comprises a reactor, denoted in its entirety by the reference 1, which is provided with an inlet 2 for the effluent, which inlet is immersed in the reaction volume, and with an outlet 3 for the treated effluent, after oxidation treatment in the reactor. The said reactor is divided into two compartments 4 and 5 separated by a vertical wall 6 which allows the effluent to pass, respectively at its upper and lower ends, the two compartments thus being in communication at the top and bottom parts of the said reactor.

DETAILED DESCRIPTION OF THE INVENTION

Figure 1:
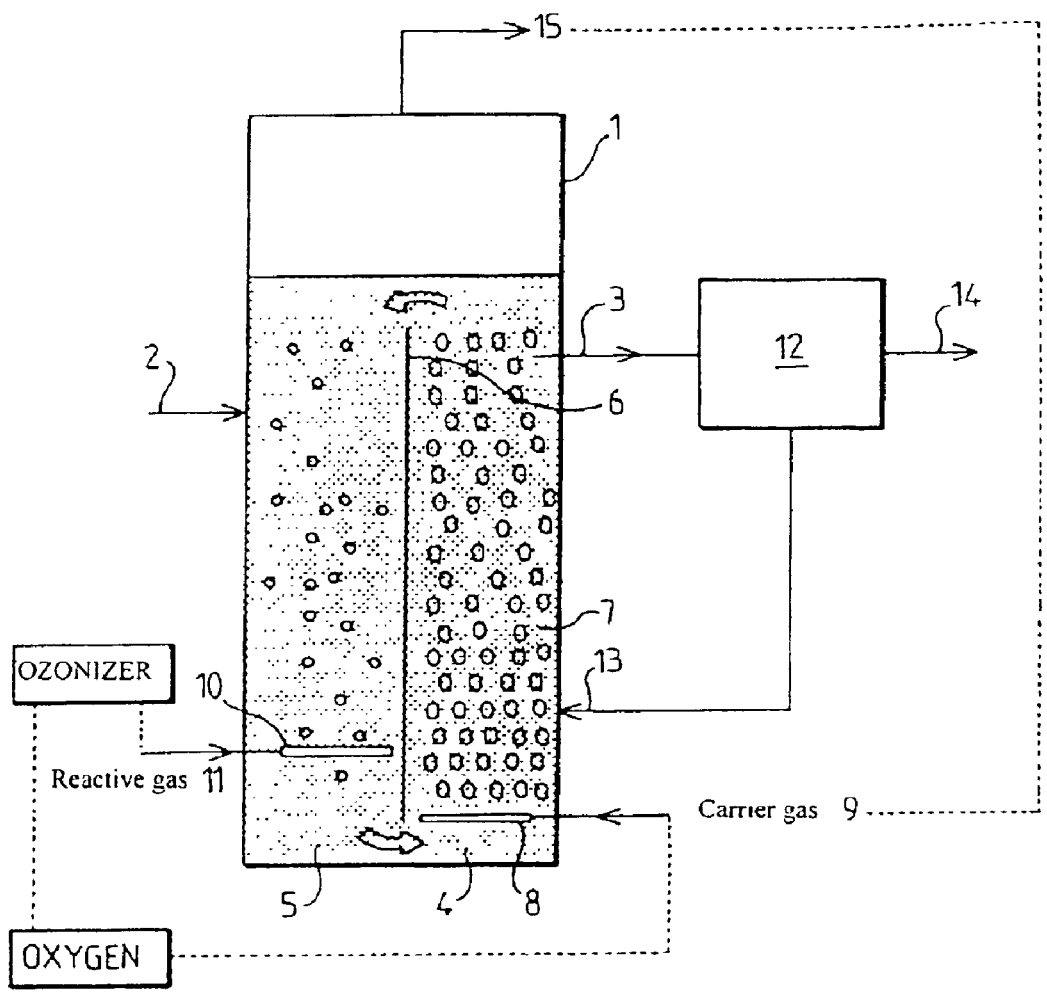

The reactor 1 is partially filled with the catalyst 7, which is initially introduced in the form of a suspension. The compartment 4 is equipped with means 8 for injection and diffusion of bubbles of the carrier gas 9, the latter being introduced at the level of the lower end of the wall 6. The carrier gas 9 can be introduced by any known means which provides for the diffusion of a gas in the form of bubbles with a diameter of a few millimeters. This means for diffusion of the carrier gas and its injection device, the space between the bottom end of the separating wall 6 and the inlet 2 for the effluent, are designed so as to obtain an upward cocurrent flow of the gas phase and of the liquid phase in the compartment 4. Under the effect of the flow of the two fluid phases, the catalyst is homogeneously suspended in the compartment 4 (entrainment compartment) and it is entrained into the compartment 5 (reaction compartment) as a downward flow of the aqueous phase.

According to the present invention, the height separating the top end of the vertical wall 6 from the top of the reactor 7 is sufficient in order to produce, in the top part of the reactor, as is seen in the drawing, a degassing region which also allows the liquid-solid suspension to flow without disturbing its concentration of catalyst.

The compartment 5, that is to say the reaction compartment, is equipped with a system 10 for injection and diffusion of the oxidizing reactive gas 11 in the form of fine bubbles exhibiting a diameter of less than 1 mm. This system is designed so as to operate with a gas flow rate such that it provides for the transfer of the oxidizing reactive gas into the liquid phase, with first cocurrent flow by entrainment of the fine bubbles and then countercurrent flow as the bubbles coalesce and become bigger, without, however, producing reversal of the direction of the downward circulation of the liquid-solid suspension.

This configuration, specific to the invention, is favourable to the catalytic oxidation reaction for the following reasons:

first, the transfer of the oxidizing gas under plug flow conditions into the fully mixed liquid-solid phase is optimized, as is the transfer of the dissolved oxidizing reactants and of the compounds to be oxidized towards the surface of the catalyst particles, and secondly, the contact time of the reactive gasliquid-solid phases is maximized by the rise of the bubbles in the reaction compartment 5, after coalescence.

The oxidized mixed liquid-solid phase recirculates into the entrainment compartment 4 in order to be brought back to the level of the outlet 3 of the reactor. At the top of the compartment 4, the liquid flow is divided into two streams, respectively directed one towards the reaction compartment 5 and the other towards a liquid-solid separation means 12, so as to separate the catalyst particles entrained by the treated effluent and to recycle them by bringing them back into the reactor 1 at the level of an inlet 13 which is situated above the level of injection of the carrier gas 9.

The liquid-solid separation means 12 can be chosen according to the applications of the plant, this means being able to provide for simple separation by settling or accelerated separation by settling or even microsieving or separation employing membrane techniques. It is thus possible to use a lamellar separator.

The treated effluent is discharged via an outlet 14 according to a flow rate equivalent to that of the raw water introduced. The gas phase of the reactor is discharged via a vent 15 which is situated at the upper end of the reactor 1. The gas thus discharged, which is composed mainly of carrier gas, can be recycled at 8 as carrier gas or alternatively can be reused in other applications. When this gas is recycled, it is no longer necessary to provide an external source of carrier gas, as soon as operating equilibrium is reached. When the reactive gas 11 is ozone, the gas extracted from the reactor via the vent 15 is optionally conveyed to a plant for destroying the residual ozone or, preferably, to a secondary use of the residual ozone.

The advantages introduced by the plant which is the subject-matter of the present invention are particularly significant and they make it possible in particular to increase the efficiency of the treatment by additionally contributing thereto great flexibility of operation and of adaptation to applications very different from one another. Mention may more particularly be made, among these advantages, of the following:

the conditions for keeping the catalyst in suspension and for internally recycling the liquid-solid phase, which are independent of those related to the catalytic reaction (circulation/oxidation separation)

the optimization of the catalytic oxidation reaction, or from the viewpoint of the reaction kinetics and of the phenomena of transfer between the gas-liquid and solid phases, by virtue of the control of the contact time and of the control of the concentrations of catalyst and of reactive gas acceptable in the interacting phases;

the ability to adjust the rate of recirculation of the liquid-solid fluid by varying the flow rate of carrier gas, without necessarily modifying the amount of oxidizing gas used. The rate of recycling of the aqueous phase can vary from 5 to 2000;

the optimization of the reaction conditions which makes it possible to exhaust the fraction of oxidizing gas before discharge, which restricts the problems of safety and of corrosion (tests show, in the context of the invention, 98% use of the ozone injected, in comparison with the standard use in the vicinity of 80% with conventional techniques);

the extent of the catalyst particle size range allowed by the combined three-phase system;

the quality of the final separation of the liquid and catalyst particles, which makes possible recycling of the catalyst;

the insensitivity of the process and plant to the concentration of suspended matter in the inflowing water to be treated.

A practical example of the implementation and use of the invention has been given below, this example having no limiting nature.

In this example, use was made of a reactor exhibiting a working volume of 10 m³ for a liquid height of 3 meters. The powder oxidation catalyst, exhibiting a mean particle size of 100 microns, was introduced into the liquid according to a concentration of 100 g/l.

The carrier gas, composed of oxygen, was injected at the bottom of the compartment 4 of the reactor in the form of bubbles according to a flow rate of 80 m³/m².h, which made it possible to induce a rate of entrainment of, the liquid phase of 0.3 m/s. Furthermore, the reactive gas used was composed of ozone at a 10% concentration in oxygen and it was introduced at the level of the lower third of the compartment 5 according to a flow rate of 10 m³/m².h via a porous ceramic diffuser which makes it possible to obtain bubbles of moderate size, that is to say of approximately 100 microns.

The effluent to be treated was industrial wastewater exhibiting a flow rate of 25 m³/h and comprising a daily average of 300 mg/l nonbiodegradable Total Organic Carbon (TOC). The mean residence time in the reactor was approximately 20 mn.

During the establishment of the liquid flow rate, between 0 and 25 m³/h, the reactive gas flow rate was proportionate to the flow rate of incoming liquid. The concentration of ozone in the reactive gas was adjusted to between 1 and 14% according to the measurement of the TOC or of the concentration of Volatile Fatty Acids at the outlet of the treatment.

The recovery of the catalyst, in suspension in water, at the outlet of the reactor was carried out by an accelerated lamellar separator immediately downstream of the outlet for treated water, as represented by 12 in the FIGURE. After separation by settling, the catalyst was recycled in the entrainment compartment 4.

The desired catalytic oxidation yield remained stable, to within 10%, over the wide ranges of liquid flow rate and of ozone concentration used, which demonstrates the efficacy and the flexibility of the plant according to this invention.

Excess gas exiting from the reactor was discharged via the vent 15 and recycled in a downstream stage of biological treatment of the effluent.

It remains, of course, that the present invention is not limited to the embodiments and to the implementation examples described and/or mentioned above but that it encompasses all the alternative forms thereof.

What is claimed is:

1. Process for the purification of aqueous effluents, in particular polluted water, by catalytic oxidation, making use of a three-phase reactor including two communicating compartments, in the process comprising:

keeping the catalyst in suspension and circulating it continuously between the two compartments in the reactor by entrainment under the effect of a carrier gas injected into one of the compartment which is an entrainment compartment, an upward and cocurrent flow of the gas phase and of the liquid phase being produced in the entrainment compartment, and oxidizing the pollutants in contact with the catalyst in the other compartment which is a reaction compartment, by injection of a reactive oxidizing gas into the lower part of the reaction compartment, the suspended catalyst circulating in the reaction compartment as a downward flow of the aqueous phase while the oxidizing gas circulates as an upward counter current flow, without producing reversal of the direction of the downward circulation of the suspended catalyst.

2. Process according to claim 1, wherein the reactive oxidizing gas is oxygen.

3. Process according to claim 1, wherein the reactive oxidizing gas is ozone selectively mixed with air or with oxygen according to a concentration in the order of 1 to 16% by mass.

4. Process according to claim 1, wherein the carrier gas is selectively air or oxygen.

5. Process according to claim 1, wherein the catalyst is an oxidation catalyst chosen from the group of the compounds which are metal oxides of transition metals, it being possible for this catalyst to be deposited on an inorganic support.

6. Process according to claim 5, wherein the catalyst exhibits a particle size of between 20 microns and 1 mm, preferably between 100 and 300 microns.

7. A plant for the purification of aqueous effluents, in particular of polluted water, by catalytic oxidation, comprising:

a three-phase reactor equipped with an inlet, immersed in a reaction volume, for the effluent to be treated and with an outlet for the treated effluent, the reactor being separated into an entrainment compartment and a reaction compartment by a vertical wall which allows the effluent to pass, respectively at its upper and lower ends, the two compartments thus being in communication at the top and bottom parts of the reactor, the reactor filed with catalyst;

means for injection and diffusion of bubbles of a carrier gas positioned in the entrainment compartment at the level of the lower end of the separating wall, the carrier gas providing for the maintenance of the catalyst in a suspension, and its continuous circulation between the two compartments, and means for injection and diffusion of a reactive oxidizing gas, in the form of fine bubbles, in order to provide for the oxidation of pollutants in contact with the catalyst, these means being positioned in the lower part of the reaction compartment, so that the oxidizing gas circulates as an upward counter current flow, without producing reversal of the direction of the downward circulation of the suspended catalyst.

8. Plant according to claim 7, wherein the means for injection and diffusion of the carrier gas, the space between the lower end of the separating wall and the inlet of the effluent to be treated, cooperate to obtain an upward cocurrent flow of the gas phase and the liquid phase in the entrainment compartment.

9. Plant according to claim 7, wherein the height of the space situated between the upper end of the wall and the top of the reactor is chosen so as to produce, in the top part of the reactor, a degassing region equipped with a vent.

10. Plant according to claim 7, further comprising a separator which is positioned at the outlet for the effluent treated in the reactor in order to make possible recycling of the catalyst in the entrainment compartment of the reactor.

* * * * *